United States Patent Office 3,435,042
Patented Mar. 25, 1969

3,435,042
NOVEL MORPHANTHRIDINE DERIVATIVES
Alexander E. Drukker, Milwaukee, and Claude I. Judd, Mequon, Wis., assignors to Colgate-Palmolive Company, New York, N.Y., a corporation of Delaware
No Drawing. Filed Mar. 30, 1965, Ser. No. 444,025
Int. Cl. C07d 57/02, 41/08; A61k 27/00
U.S. Cl. 260—293                                     5 Claims

ABSTRACT OF THE DISCLOSURE

The compounds are dihydroimidazomorphanthridines useful as anticholinergic, antihistaminic and psychopharmacologic agents. A species disclosed is 8-(3-methylaminopropyl) - 2,3 - dihydroimidazo[1,2-a]morphanthridine.

---

This invention relates to novel dihydroimidazomorphanthridine derivatives and processes of preparing such derivatives. More particularly, this invention is concerned with novel 2,3-dihydroimidazo[1,2-a]morphanthridines, novel intermediates associated with the preparation of these compounds, processes of producing the intermediates and final compounds and pharmacologic and therapeutic uses for such compounds.

The novel compounds prepared in accordance with the procedure of this invention have the formulae:

N-lower alkyl piperidyl, N-(phenyl lower alkyl)piperidyl and the like; and $R_5$ and $R_6$ are the same or different groups including hydrogen, a lower alkyl such as methyl, ethyl, propyl, isopropyl or butyl, a lower alkenyl such as allyl, an aryl such as phenyl or a nuclear-substituted phenyl, an aralkyl such as benzyl, phenethyl, phenylisopropyl, diphenylmethyl, trityl, naphthylmethyl, a cycloalkyl, particularly cycloalkyl groups having from 5 to 7 carbon atoms such as cyclopentyl, cyclohexyl, a cycloalkyl-lower alkyl such as cyclohexylmethyl or cyclopentylethyl and groups in which

represents a group such as morpholino, pyrrolidino, piperidino, piperazino, 1,2,3,4-tetrahydroquinolino, 4-lower alkyl piperazino such as 4-methylpiperazino, 4-(phenyl-lower alkyl)-piperazino such as 4-benzyl-piperazino and 4-(alpha-methylphenethyl)-piperazino and 4 - (hydroxy-lower alkyl)-piperazino such as 4-(2-hydroxy-1-ethyl) piperazino.

The compounds of Formula I may be prepared by treating a 5,6-dihydro-6-morphanthridone with phosphorous pentachloride to form a 6-chloromorphanthridine which on treatment with an aminoalcohol such as aminoethanol yields the aminoalcohol derivative. Heating that com-

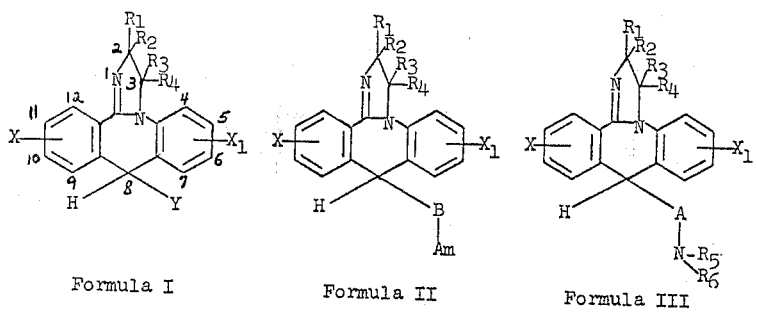

Formula I        Formula II        Formula III wherein X and $X_1$ are hydrogen, a halo group such as chloro and bromo, a lower alkoxy such as methoxy and ethoxy, a lower alkyl such as methyl and butyl, a lower alkyl-thio such as thiomethyl and thioethyl and trifluoromethyl; $R_1$, $R_2$, $R_3$ and $R_4$ are hydrogen or lower alkyl such as methyl, ethyl, isopropyl and butyl; Y is hydrogen or lithium; A is a lower straight or branched alkylene (1-6 carbon atoms); B is a chemical bond or a lower straight or branched alkylene (1 to 6 carbon atoms); Am is a cyclicamino group such as pyridyl, pyrrolidyl, piperidyl, pound or preferably treating it with thionyl chloride followed by treatment with alkali results in the formation of the dihydroimidazomorphanthridine (the compound of Formula I in which Y is hydrogen). This compound may be treated with an alkyl or aryl lithium compound to form the compounds of Formula I in which Y is lithium.

The compounds of Formula II may be prepared by treating a compound of Formula I in which Y is lithium with halo cyclicamines. The compounds of Formula III may be prepared by treating a compound of Formula I in which Y is lithium with an aminoalkyl halide. The process of the invention may be represented as follows:

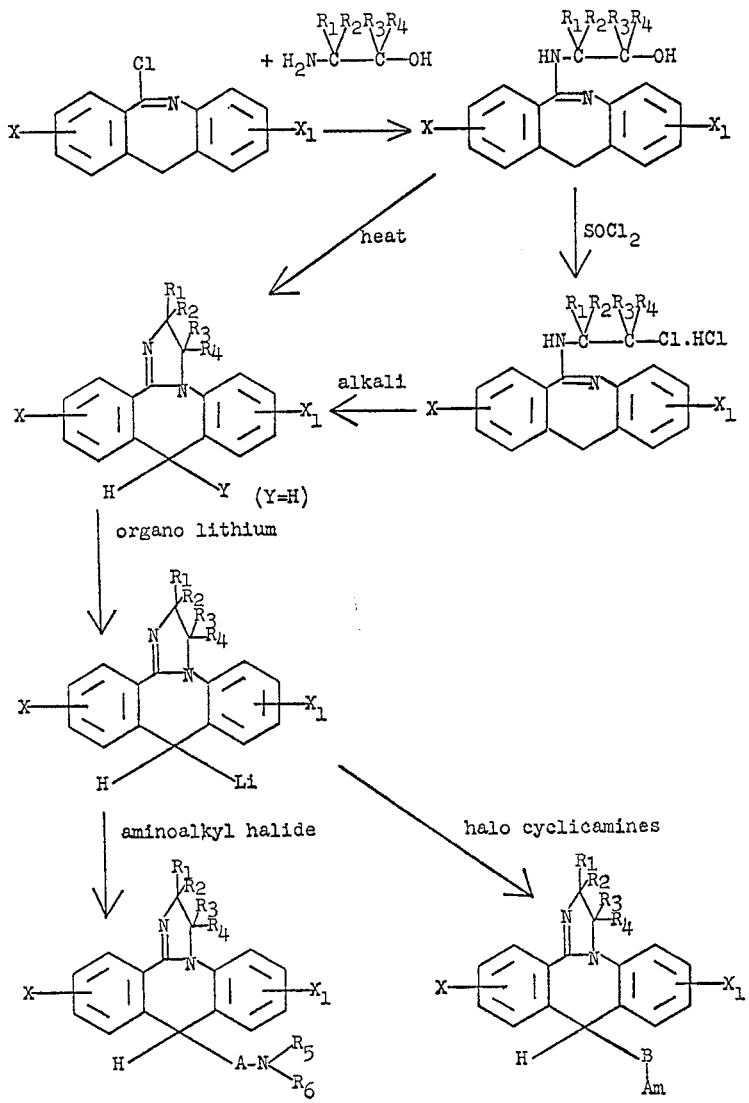

wherein the symbols have their previously assigned values.

The 6-chloromorphanthridines employed as starting materials may be prepared by treating a 5,6-dihydro-6-morphanthridone with phosphorus pentachloride. The 5,6-dihydro-6-morphanthridones may be prepared according to the procedures described in United States Patent 2,973,354.

Examples of some of the 6-chloromorphanthridines which may be employed are:

6-chloromorphanthridine,
2,6-dichloromorphanthridine,
2-trifluoromethyl-6-chloromorphanthridine, and
3-methyl-6-chloromorphanthridine.

The reaction between the 6-chloromorphanthridine and the aminoalcohol is conveniently effected by bringing the reactants together in admixture in a phenolic solvent such as molten phenol, cresol or the like. The reaction mixture, if desired, may be heated at temperatures up to and exceeding 150° C. in order to promote the reaction.

Representative of the aminoalcohols which may be used in the described process are:

aminoethanol,
2-aminopropanol,
1-amino-2-propanol, and
3-amino-3-hydroxymethylpentane.

Examples of the aminoalcohol derivatives which may be prepared employing the process described above are:

6-(2-hydroxyethylamino)morphanthridine,
6-(2-hydroxyisopropylamino)morphanthridine,
6-(3-hydroxymethyl-3-pentylamino)morphanthridine, and
2-chloro-6-(2-hydroxyethylamino)morphanthridine.

The aminoalcohol derivatives may be treated with thionyl chloride to yield the corresponding chloride hydrochloride derivative. The reaction is preferably conducted in a suitable solvent such as chloroform at or about reflux temperatures.

The chloride hydrochloride derivative may be dissolved in a suitable solvent such as methanol in the presence of a base, and heated, preferably at reflux temperature, to effect a ring closure to yield the dihydroimidazomorphanthridine (the compound of Formula I in which Y is hydrogen).

The dihydroimidazomorphanthridines may also be prepared directly from the previously described aminoalcohol derivative by heating said derivative for an extended period of time at an elevated temperature, e.g., up to and exceeding 200° C.

Representative dihydroimidazomorphanthridines are:

2,3-dihydroimidazo[1,2-a]morphanthridine,
2-methyl-2,3-dihydroimidazo[1,2-a]morphanthridine, and
6-chloro-3-ethyl-2,3-dihydroimidazo[1,2-a] morphanthridine.

The lithio-derivatives, the compounds of Formula I in which Y is lithium, may be prepared by treating the corresponding dihydroimidazomorphanthridine with an organo lithium such as an aryl lithium or alkyl lithium compound, e.g., butyl lithium. Preferably, the reaction is conducted in a suitable anhydrous solvent, such as tetrahydrofuran, at room temperature.

The following compounds are representative of those which may be formed by the above procedure:

8-lithio-2,3-dihydroimidazo[1,2-a]morphanthridine,
8-lithio-2,3-dimethyl-2,3-dihydroimidazo[1,2-a]morphanthridine, and
8-lithio-6-chloro-2,3-dihydroimidazo[1,2,-a] morphanthridine.

The compounds of Formulae II and III may be readily formde by reacting the aforementioend lithio derivative with a halo cyclicamine or an aminoalkyl halide, respectively. The reactions are preferably conducted by dissolving the lithio derivative in an inert solvent such as ether or tetrahydrofuran and treating it with the appropriate aminoalkyl halide or halo cyclicamine. This reaction proceeds substantially to completion at room temperature.

Among the aminoalkyl halides which may be employed are the following:

3-dimethylaminopropyl chloride,
3-(N-methyl-N-benzylamino)propyl bromide, and
2-diethylaminoethyl chloride.

Among the halo cyclicamines which may be employed are the following:

1-methyl-4-chloropiperidine,
1-allyl-3-chloropiperidine, and
1-benzyl-4-bromohomopiperidine.

Representative of the novel compounds which may be formed by the above described process are the following:

8-(3-dimethylaminopropyl)-2,3-dihydroimidazo[1,2-a]morphanthridine,
7-(1-methyl-4-piperidyl)-2,3-dihydroimidazo[1,2-a]morphanthanthridine, and
8-[3-(N-methyl-N-benzylamino)propyl]-6-chloro-2-methyl-2,3-dihydroimidazo[1,2-a]morphanthridine.

The compounds of the present invention, as well as their non-toxic salts are promising pharmaceutical candidates, e.g., as anticholinergic, antihistaminic, antidepressant, tranquilizing, and psychopharmacologic agents. In addition, some of them block tremorine induced tremors in animals which is indicative of an anti-Parkinsonism activity. These compounds, of course, may also be used as intermediates in the preparation of more complex chemical and pharmaceutical agents.

The compounds can be administered to animals as pure compounds, as the bases, or in the form of a pharmaceutically acceptable non-toxic salt. However, to obtain a more practical size to dosage relationship, one or more of the compounds is generally combined with a suitable pharmaceutical carrier and made into unit dosage forms. These dosage forms may be made for either oral or parenteral administration.

Pharmaceutical carriers which are either liquid or solid may be employed. The preferred liquid carrier is water. However, in the event the compound is not soluble or miscible in water, an organic solvent such as ethylene glycol may be employed. Flavoring materials may be included if desired.

Solid pharmaceutical carriers such as starch, sugar and talc can be utilized to form powders. These powders can be used as such or can be tableted or used to fill gelatin capsules. Suitable lubricants such as magnesium stearate, binders such as gelatin and disintegrating agents such as sodium carbonate in combination with citric acid may be employed in the formation of the tablets.

Unit dosage forms, such as tablets and capsules, may contain any suitable predetermined amount of one or more of the active ingredients as non-toxic acid addition salts and may be administered one or more at a time at regular intervals. Such unit dosage forms, however, should generally contain a concentration of 0.1% to 10% by weight of one or more of the active agents. Such unit dosage forms should advisably contain about 5 to 150 mgm. of the active ingredients.

The following examples are presented to illustrate this invention:

EXAMPLE I 6-(2-hydroxyethylamino)morphanthridine

A mixture of 20.9 g. (0.1 mole) of 5,6-dihydro-6-morphanthridone and 29 g. phosphorus pentachloride is heated in a 130° oil bath for 2 hours. When the mixture becomes liquid, hydrochloric acid escapes and phosphorus oxychloride begins to reflux. The phosphorus oxychloride which forms and the excess phosphoric pentachloride are distilled off at 18 mm. and the residue is fractionated through a short column to give a crude 6-chloromorphanthridine, B.P. 162° (0.2 mm.). A small amount is refractionated and a fraction obtained of 6-chloromorphanthridine, B.P. 132° (0.025 mm.).

To 122 g. (2 moles) of 2-aminoethanol in 250 g. of molten phenol is added 28.4 g. (0.124 mole) of 6-chloromorphanthridine and the mixture is stirred at 150–160° for 14 hours. Most of the excess aminoethanol and phenol are removed by distillation under reduced pressure on a steam bath. The rest is treated with dilute sodium hydroxide. The solid residue is dissolved in 250 ml. of dichloromethane and extracted with 250 ml. of 1 N hydrochloric acid. The aqueous layer is separated, made alkaline with potassium hydroxide and the solid which separates is collected, dried, and recrystallized from 500 ml. of ethanol to give 6-(2-hydroxyethylamino)morphanthridine, M.P. 204–205°. Repeated crystallizations from ethanol raises the M.P. to 205–207°.

*Analysis.*—Calcd. for $C_{16}H_{16}N_2O$: C, 76.16; H, 6.39; N, 11.10. Found: C, 76.21; H, 6.17; N, 11.09.

EXAMPLE II 6-(2-chloroethylamino)morphanthridine hydrochloride

A solution of 11.6 g. (0.0417 mole) of 6-(2-hydroxyethylamino)morphanthridine and 300 ml. of chloroform is brought to pH 1.0 with anhydrous hydrogen chloride. Thionyl chloride (11.6 g.; 0.098 mole) is added dropwise, and the reaction mixture is stirred and refluxed for 3 hours. After removal of the solvent and excess thionyl chloride, the resulting yellow oil is crystallized from 400 ml. of Skelly C. After recrystallization from ethanol and ether, the salt, 6-(2-chloroethylamino)morphanthridine hydrochloride is obtained, M.P. 184–186°.

*Analysis.*—Calcd. for $C_{16}H_{16}Cl_2N_2$: C, 62.55; H, 5.25; N, 9.13; Cl, 23.08. Found: C, 62.32; H, 5.26; N, 9.05; Cl, 23.63.

EXAMPLE III

2,3-dihydroimidazo[1,2-a]morphanthridine

A solution of 52 g. (0.17 mole) of 6-(2-chloroethylamino)morphanthridine hydrochloride in 2 l. of methanol is treated with 84 ml. of 5 N sodium hydroxide, and the solution is heated to reflux for 3 hours. The solution is concentrated, treated with water, extracted with ether, washed with water, and concentrated to give 2,3-dihydroimidazo[1,2-a]morphanthridine, M.P. 161-163°.

EXAMPLE IV

8 - [3 - (N-methyl-N-benzylamino)propyl] - 2,3-dihydroimidazo[1,2-a]morphanthridine To a solution of 11.7 g. (0.05 mole) of 2,3-dihydroimidazo [1,2-a]morphanthridine in 150 ml. of tetrahydrofuran is added 40 ml. of butyl lithium solution (0.06 mole) in 150 ml. of ether. The resulting dark solution is stirred for 4.5 hours at room temperature after which a solution of 9.9 g. (0.05 mole) of 3-(N-methyl-N-benzyl) aminopropyl chloride in 25 ml. of ether is added dropwise. The solution is stirred for 20 hours at room temperature, 25 ml. of water is added, the organic layer is separated, dried, and concentrated to give 8-[3-(N-methyl - N - benzylamino)propyl] - 2,3 - dihydroimidazo-[1,2-a]morphanthridine in the form of a brown oil.

*Analysis.*—Calcd. for $C_{27}H_{29}N_3$: N, 10.62. Found: N, 10.11.

EXAMPLE V

8-(3-methylaminopropyl) - 2,3 - dihydroimidazo[1,2-a]morphanthridine

A solution of 17 g. of 8-[3-(N-methyl-N-benzylamino)propyl]2,3-dihydroimidazo[1,2-a]morphanthridine, 5.42 g. of ethyl chloroformate, and 100 ml. of benzene is stirred and refluxed for 20 hours. The mixture is cooled, diluted with water, the organic layer is washed with water, dried, and concentrated to give 14.3 g. of the carbamate. A solution of 9.1 g. of the crude carbamate, 12.1 g. of barium hydroxide 8H$_2$O, and 200 ml. of ethylene glycol is stirred and refluxed for 12 hours, cooled, and diluted with 0.5 l. of water. The solid is filtered and extracted with benzene, the benzene extract is combined with the benzene extracts of the aqueous phase, dried over potassium carbonate, filtered, and concentrated to leave a residue which upon distillation gives 8-(3-methylaminopropyl) - 2,3 - dihydroimidazo[1,2-a]morphanthridine, B.P. 155°.

*Analysis.*—Calcd. for $C_{20}H_{23}N_3$: C, 78.65; H, 7.59; N, 13.76. Found: C, 78.36; H, 7.68; N, 13.72.

EXAMPLE VI

8-(3-dimethylaminopropyl)-2,3-dihydroimidazo[1,2-a]morphanthridine

To a solution of 11.7 g. (0.05 mole) of 2,3-dihydroimidazo [1,2-a]morphanthridine in 250 ml. of tetrahydrofuran is added 40 ml. of butyl lithium solution (0.06 mole) in 150 ml. of ether. The resulting dark green solution is stirred for 5 hours at room temperature after which a solution of 0.05 mole of dimethylaminopropyl chloride in 25 ml. of ether is added dropwise. The solution is stirred for 20 hours at room temperature, 25 ml. of water is added, the organic layer is separated, dried, concentrated, and distilled to give 8-(3-dimethylaminopropyl)-2,3 - dihydroimidazo[1,2-a]morphanthridine, B.P. 220-227° C. (1.3 mm.).

*Analysis.*—Calcd. for $C_{21}H_{25}N_3$: C, 78.96; H, 7.89; N, 13.15. Found: C, 78.74; H, 8.11; N, 13.15.

EXAMPLE VII

8-(1-methyl-4-piperidyl)-2,3-dihydroimidazo [1,2-a]morphanthridine

To a solution of 23.4 g. (0.1 mole) of 2,3-dihydroimidazo [1,2-a]morphanthridine in 300 ml. of tetrahydrofuran is added 0.11 mole (73.5 ml.) of a butyl lithium solution in 300 ml. of ether. The colored solution is stirred 5 hours at room temperature, after which 14.7 g. (0.11 mole) of 1-methyl-4-chloropiperidine in 50 ml. of ether is added dropwise. After standing at room temperature overnight, 80 ml. of water is added, the organic layer is separated, dried over potassium carbonate, filtered and concentrated to give a residue of 39 g. This residue is distilled to give 8-(1-methyl-4-piperidyl)-2,3-dihydroimidazo [1,2-a]morphanthridine, B.P. 217-245° (0.1 mm.). On redistillation, the boiling point was 200° (0.05 mm.).

*Analysis.*—Calcd. for $C_{22}H_{25}N_3$: C, 79.70; H, 7.60; N, 12.68. Found: C, 80.00; H, 7.62; N, 12.60.

We claim:

1. A member of the group consisting of compounds of the formulae:

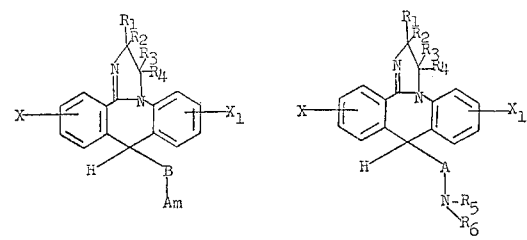

in which X and $X_1$ are selected from the group consisting of hydrogen, 2-chloro, and trifluoromethyl; $R_1$, $R_2$, $R_3$, and $R_4$ are selected from the group consisting of hydrogen and lower alkyl; A is lower alkylene; B is a chemical bond; Am is a cyclicamino group selected from N-lower alkyl piperidyl and N-(phenyl-lower alkyl) piperidyl; $R_5$ and $R_6$ are selected from the group consisting of hydrogen, lower alkyl, and benzyl.

2. 8 - [3 - (N - methyl - N - benzylaminopropyl)]-2,3-dihydroimidazo[1,2-a]morphanthridine.

3. 8 - (3 - methylaminopropyl) - 2,3 - dihydroimidazo-[1,2-a]morphanthridine.

4. 8 - (3 - dimethylaminopropyl)-2,3-dihydroimidazo-[1,2-a]morphanthridine.

5. 8-(1-methyl - 4 - piperidyl)-2,3-dihydroimidazo-[1,2-a]morphanthridine.

References Cited

UNITED STATES PATENTS 2,861,987  11/1958  Martin et al. _____ 260—293
2,973,354  2/1961  Werner.
3,153,652  10/1964  Drukker et al.

HENRY R. JILES, *Primary Examiner.*

E. D. LEWIS, *Assistant Examiner.*

U.S. Cl. X.R.

260—309.6, 999, 294.7, 293.4, 247.1, 247.5, 2, 268, 239, 288, 289, 326.5, 326.82, 326.85, 296